United States Patent [19]
Peterjohn et al.

[11] Patent Number: 5,330,236
[45] Date of Patent: Jul. 19, 1994

[54] COMPOSITE TUBE FITTING

[75] Inventors: Robert F. Peterjohn, Los Alamitos; Dale W. Gordon, Orange; Richard J. Drysdale, Anaheim, all of Calif.

[73] Assignee: Aerofit Products, Inc., Buena Park, Calif.

[21] Appl. No.: 956,666

[22] Filed: Oct. 2, 1992

[51] Int. Cl.⁵ .................... F16L 39/02; F16C 3/02
[52] U.S. Cl. .................... 285/149; 285/423; 138/109
[58] Field of Search .......... 285/149, 423, 334.5; 138/109

[56] References Cited

U.S. PATENT DOCUMENTS

| | | | |
|---|---|---|---|
| 1,809,313 | 6/1931 | Root | 285/423 |
| 1,853,698 | 4/1932 | Parker | 285/423 |
| 2,736,578 | 2/1956 | Rafferty | 285/91 |
| 2,970,184 | 1/1961 | Blonder | 174/88 C |
| 3,109,052 | 10/1963 | Dumire et al. | 174/88 C |
| 3,120,966 | 2/1964 | Lyon | 285/149 |
| 4,185,472 | 1/1980 | Yates et al. | 138/109 |
| 4,240,652 | 12/1980 | Wong et al. | 285/91 |
| 4,477,108 | 10/1984 | Castelbaum et al. | 138/109 |
| 4,854,613 | 8/1989 | Reece et al. | 285/55 |

OTHER PUBLICATIONS

Copy of article entitled "Preloaded Composite-Strut-/End-Fitting Joint", *NASA Tech. Briefs* (Jul. 1990).
Copy of article entitled "Composite Member Coupled to Components Without Cutting Fibers", *Design News*, Jun., 1986.

*Primary Examiner*—P. Austin Bradley
*Assistant Examiner*—Jeffrey T. Knapp

[57] ABSTRACT

An end fitting for a composite tube used in high pressure hydraulic systems. The tube includes a composite matrix wrapped around a metal liner. The fitting includes an inner sleeve having a plurality of holes with pins therein extending into the matrix for securing the sleeve to the matrix. An outer sleeve fitting over the inner sleeve retains the pins within the holes, and the inner sleeve prevents the outer sleeve from sliding off the end of the tubing. A forward inner sleeve or ring encloses the end of the matrix and is also surrounded by the outer sleeve. A nut is retained on the outer sleeve for joining to a connector having an end surface which mates with the end of the liner flared against the end ring.

18 Claims, 4 Drawing Sheets

COMPOSITE TUBE FITTING

BACKGROUND OF THE INVENTION

This invention relates to a system for securing end fittings for light weight, but strong composite tubing and the like. The system is particularly useful with tubing subjected to high operating pressures, one example of which is use in aircraft hydraulic systems.

Composite tubing has proven to be increasingly useful in many applications due to its high strength and low weight. A prime example of this is the use of composite tubing in aircraft high pressure hydraulic systems. Improvements in materials has created composite tubing that can provide the necessary strength but with less weight than that of metal. As is well known, any weight saving is of great value in aircraft because of energy conservation and resulting cost saving.

Such composite tubing typically is being made of large numbers of strong, long fibers or filaments bonded together by suitable resins to create a strong rigid matrix. Various materials are being used for fibers, such as Kevlar, carbon and glass. The fibers are arranged in a wide variety of patterns, usually involving many layers of crossed fibers. For example, one or more layers may be arranged spirally around a mandrel alternately arranged with other layers of fibers spiraling in the opposite direction so that the fibers intersect. In other approaches, the fibers are braided or woven, still resulting in crossed fibers or mesh-type constructions. Resin is applied to the fibrous mesh in various ways or stages. In high pressure fluid applications, the matrix has a thin inner liner of metal or other fluid impervious material to provide additional sealing capability.

Currently, end fittings for composite tubing are attached by winding filaments over one or more ridges on the end fitting and curing the composite so that the ridges support the longitudinal loading, by attaching end fittings with adhesive, or by mechanically squeezing the tubing wall between ridged, tapered and/or grooved mating sections that grip the ID and OD of the tubing. Curing the end fitting in place requires that each tube length be fabricated to size at the factory. Fitting ends attached with adhesive do not provide the strength for high pressure applications. Current mechanical means do not provide sealing for high pressure applications.

Also, there is a need to fabricate tubing lengths for repair of damaged tube assemblies in the field. This can be for permanent installations like oil field pumping stations, for aircraft at remote air fields or carriers, or for space stations in orbit.

The problem of damaged tubing has sometimes been handled by shipping the tubing back to the factory where end fittings can be installed. Because it is not practical to let expensive equipment sit idle, a damaged tube has instead typically been replaced by a new one, while the damaged one if repairable was returned to the factory. This in turn creates a need for carrying inventory of adequate replacement tubes. Compounding this problem is the fact that most tubing in aircraft hydraulic systems is cut to a precise length. Thus, a supply of a few sizes is not sufficient, but instead it is necessary to have a supply of each particular tubing that has a likelihood of being needed for replacement.

While there are many different systems shown in the prior art for connecting end fittings to a tubular member, the high pressure operation must be kept in mind. For example, commercial airplanes typically have hydraulic systems operating at 3000 psi; military planes typically have operating pressures of 4000 psi and some newer ones reaching 5000 psi. Moreover, there are some research and development activities utilizing pressures in the range of 8000 psi. In addition, it is necessary from a safety standpoint that such tubing be able to withstand three to four times the operating pressures. By extreme contrast, everyday garden hoses are typically subjected to no more than a 100 psi.

Metal tubing, which is replaced by the composite tubing, may have a circumferential score line formed in its periphery to assist in connecting an end fitting, but such an approach is unsatisfactory for composite tubing because the fibers cannot be cut without having an unacceptable corresponding loss of strength.

Thus, there is a significant need for an improved end fitting for composite members, particularly tubing subjected to high operating pressures such as in hydraulic systems. Such a fitting should be capable of easy connection on the job site without the use of complex machinery so that a supply of uncut tubing may be kept at the job site and then cut to a desired length for connection to an end fitting. A satisfactory fitting can of course not be significantly detrimental to the resin fiber matrix of the tubing.

SUMMARY OF THE INVENTION

The present invention comprises a fitting connectable to an end of an elongated member, such as a tube made of a composite matrix of fiber and resin. In addition, if the tubing is to be used for high pressure fluid, it may have a thin interior liner made of metal or other suitable material impervious to the fluid. The fitting comprises a plurality of pins which are pressed into the composite material. The pins connect a connector to the composite tubing by penetrating the composite matrix, without extending completely through the matrix or damaging any liner. Preferably the connector is in the form of an inner sleeve having holes through which the pins extend. An outer sleeve or connector surrounds the inner sleeve to retain the pins within the holes of the inner sleeve. A tube nut connectable to the outer sleeve may be used to connect the tubing to another component.

Preferably, the outer sleeve cooperates with the end of the inner sleeve to be held on the tubing end. Also, the inner sleeve preferably includes a separate ring-shaped element that surrounds the end of the tubing matrix and forms a seal with the liner and a mating component.

In accordance with the method of the invention, if the tubing includes a liner, the matrix is first trimmed to allow the liner to protrude beyond the end of the matrix. With or without a liner, the nut, the outer sleeve and the inner sleeve are then slid onto the tubing. The pins are positioned in the inner sleeve holes and pressed into the matrix. The outer sleeve is then slid over the inner sleeve, and the forward, inner sleeve is positioned on the end of the matrix. The nut is then slid onto the forward end of the outer sleeve after the liner is flared onto the ring.

DETAILED DESCRIPTION OF THE PREFERRED EMBODIMENT

Figure 1:
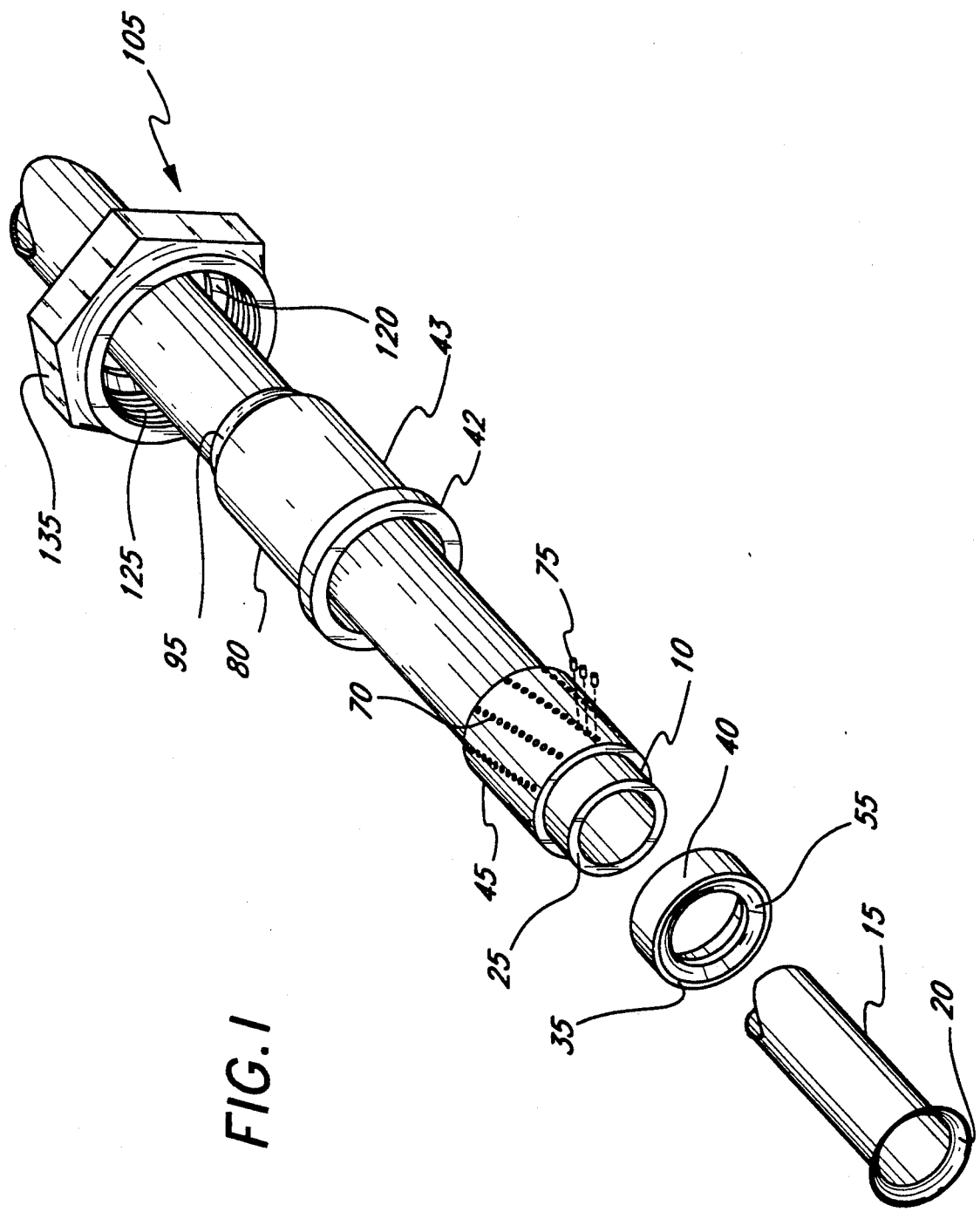
FIG. 1 is an exploded perspective view of the fitting of the present invention mounted on tubing having a matrix of fiber and resin.
Figure 2:
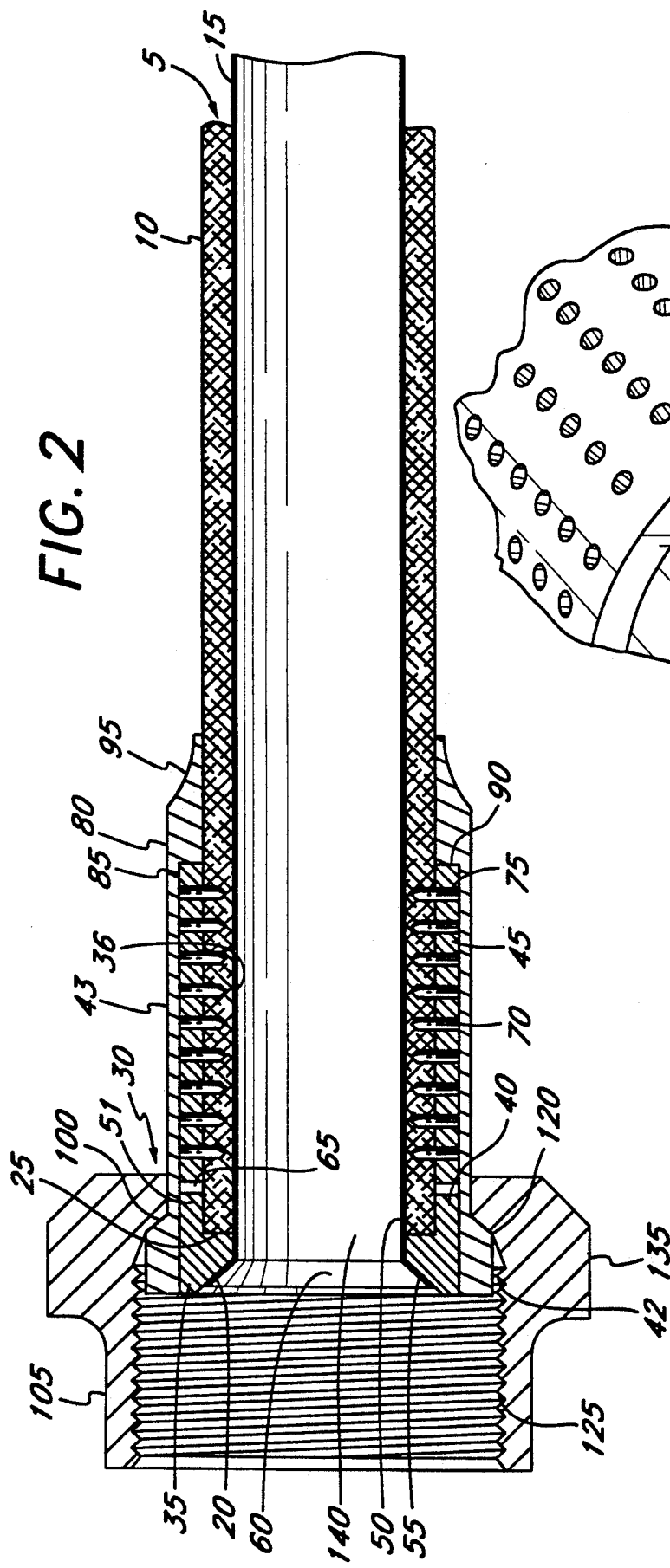
FIG. 2 is a side cross-sectional view of the fitting of FIG. 1 with the connection complete.
Figure 3:
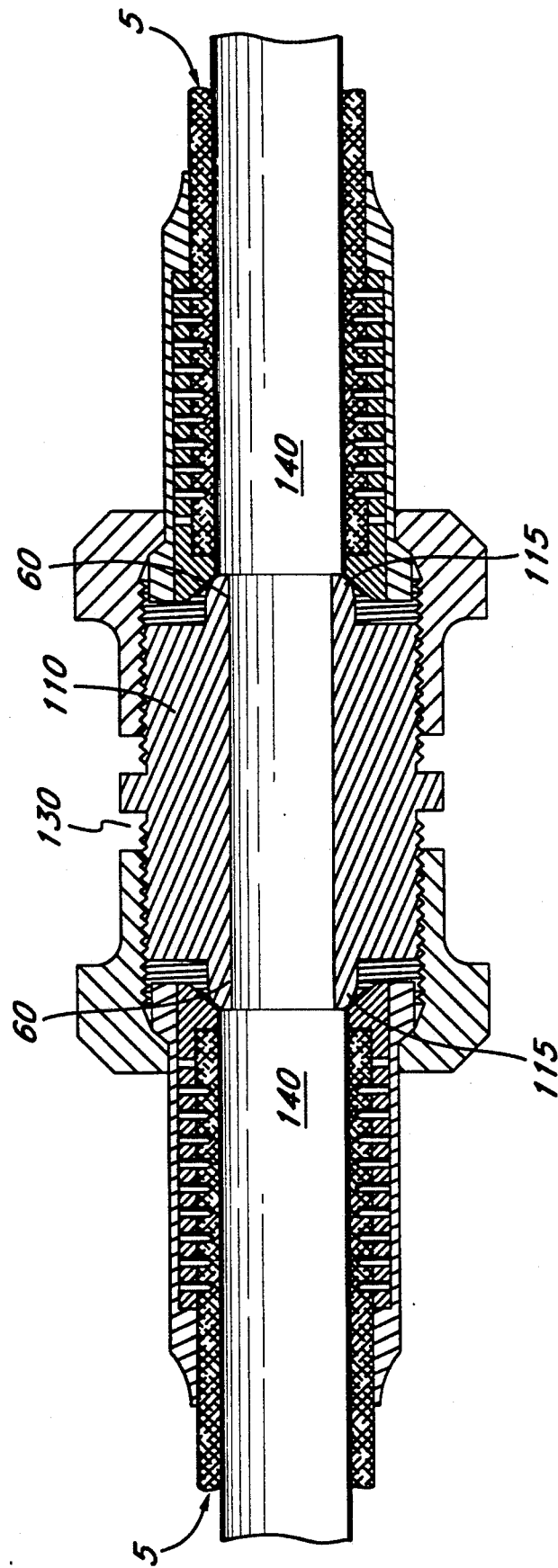
FIG. 3 is a side cross-sectional view showing the connection of two composite tubes utilizing the assembly of FIG. 2.

Referring to FIGS. 1-3, an elongated composite member in the form of tube 5 comprises a composite matrix 10 wrapped around a thin tubular liner 15. As mentioned above, the matrix is typically made of a plurality of strong fibers or filaments bonded together by a suitable resin. The liner may be made of any suitable, strong material, such as titanium. As seen, the free end 20 of the liner 15 extends beyond the front end 25 of the composite matrix 10.

The composite tube 5 is connectable to a metal fitting 30 comprising a ring or front inner connector or sleeve 40, a back inner connector or sleeve 45, an outer connector or sleeve 80 and a nut 105. The components of the fitting 30 can be made of any suitable strong material having the necessary characteristics for a particular application. Steel is acceptable but titanium is more desirable since it is much lighter. The front inner sleeve 40 fits onto the front end of the composite tube 5. The sleeve has a cylindrical exterior surface 41 and a radial forward surface 35, which tapers radially inwardly and rearwardly from an inner diameter of the surface 35 to create a tapered or frustoconical forward surface 55. The front sleeve 40 has a front section 36 with a cylindrical inner surface creating a section of maximum thickness for the front sleeve 40. The front section 36 includes an annular wall 50 extending radially outwardly from the inner diameter and leading to a rear section 51 of reduced radial thickness. The wall 50 forms an interior shoulder which abuts the front end 25 of the composite matrix 10, as shown in FIG. 2, with the rear section 51 surrounding the matrix.

The front tapered end 55 of the front inner sleeve 40 defines a flared opening 60 for the composite tube 5. The front end 20 of the metal liner 15 which extends outward of the front end 25 of the composite matrix 10 is flared outward to conform to the shape of the tapered front end 55, and forms a sealing surface for connection to another component.

The rear end of the front inner sleeve 40 is spaced from the back inner sleeve 45 by an annular gap 65. The tubular back inner sleeve 45 has a substantially constant outer and inner diameter, and snugly surrounds the composite tube 10. The back inner sleeve 45 contains a plurality of holes 70 extending radially through its entire thickness for the placement of preferably solid, hard pins 75. The outer diameter of the pins 75 is substantially equal to the diameter of the holes 70 so as to create an interference fit. In a preferred embodiment, the outer diameter of the pins 75 is in the range of 0.030 to 0.040 inches. The inserted ends of the pins 75 are tapered to facilitate penetration of the matrix.

Figure 4:
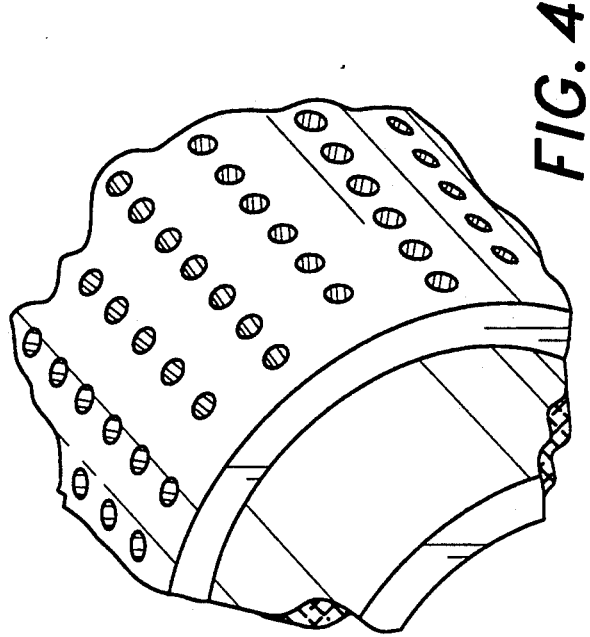
FIG. 4 is a perspective view illustrating an alternate pin pattern in an inner sleeve.

FIG. 1 shows the holes 70 arranged in a uniform pattern. More particularly, they are arranged in rows on a 12° degree angle from the longitudinal axis, to correspond to the angle of the fibers in some of the outer layers of a particular composite wrap. However, depending on the angle of the fibers, other angles for the rows may be desirable. Moreover, because of the many different fiber arrangements for composite tubing, the pins can be arranged so that their relationship with the fibers is random. For example, the spaced holes 70 may be arranged in spaced, axially extending rows, as shown in FIG. 4, that are axially offset with respect to adjacent rows, but which do not have any particular alignment with the matrix fibers.

Figure 1B:
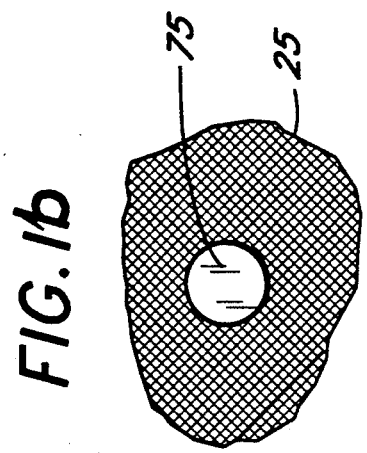
FIG. 1b is a perspective schematic view illustrating a pin penetrating the matrix between fibers.
Figure 1A:
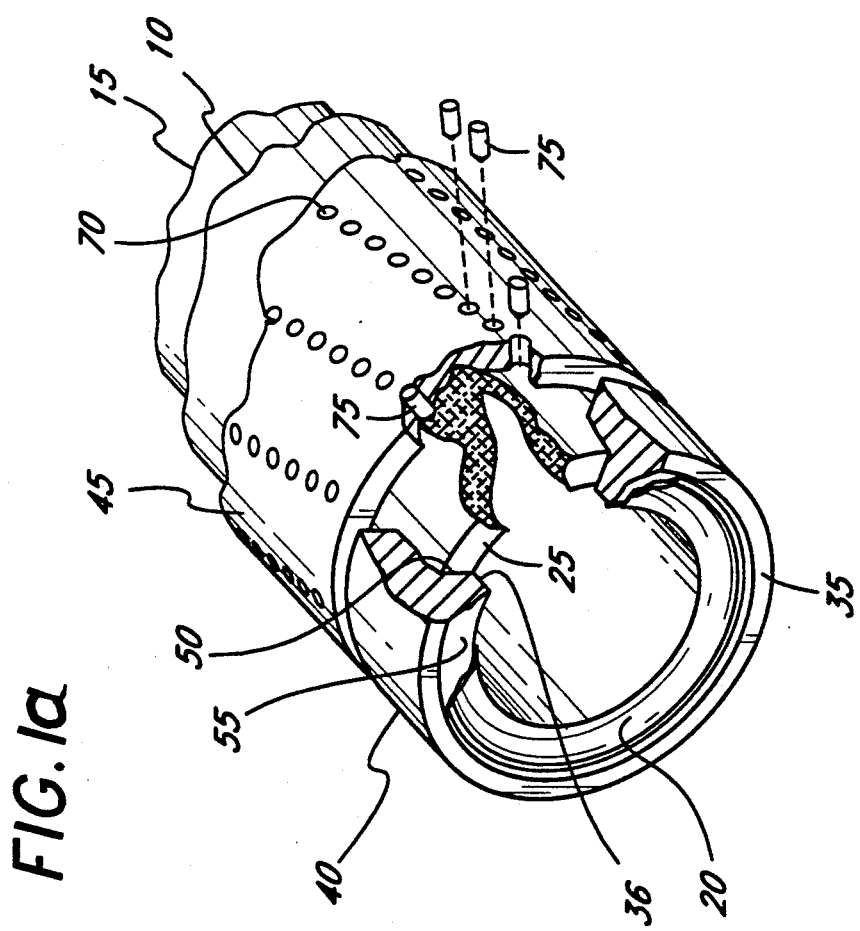
FIG. 1a is an enlarged view of part of the fitting of FIG. 1 with portions broken away.

The pins 75 must be long enough so that when they are fully inserted into the holes 70, they penetrate most of the fiber layers of the composite matrix 10, but yet are short enough so that their insertion will not damage the liner 20. Thus, as shown in FIG. 2, there should be a gap between the ends of the pins 75 and the liner 20. The length is therefore tied to the tubing wall thickness. In one example, pins in the range of 0.150 to 0.180 inches long were employed. A large number of pins should be used to provide sufficient shear area and to ensure that enough pins are held by enough fiber intersections to provide strength to the connection, as schematically illustrated in FIG. 1b. The number of pins employed depends on several factors, including the pressure requirements and the tubing diameter. In one high pressure successful prototype, 100 pins were used, arranged in ten spaced rows of ten spaced pins, with tubing of about 0.8 inch outside diameter. Smaller diameter tubing would need fewer rows of pins. It is desirable that the length of the inner sleeve 45 be minimized so as not to interfere with any bends in the tubing needed.

The outside diameter of the back inner sleeve 45 is preferably substantially equal to the outside diameter of the front inner sleeve 40. It is also possible to make the front and back inner sleeves 40 and 45 as a unitary body. However, the front inner sleeve 40 is separate from the back inner sleeve 45 in the preferred embodiment. This allows the pins 75 to move slightly when the assembly is torqued, thus preloading the fibers in the composite matrix 10. Further, this allows the sealing surface to act independently of the structure supporting the pins 75.

A tubular, preferably metal, outer sleeve 80 fits snugly over the inner sleeves 40 and 45. The forward portion 42 of the outer sleeve 80 is radially thick to create a flange having an annular rear wall 100 which tapers inwardly and rearwardly towards the inner sleeve section 43 of substantially constant outside diameter. The wall 100 forms a shoulder to engage the tube nut 105.

The sleeve 80 has an annular tail 95 which has a cylindrical forward portion which has the same diameter as that of the intermediate section 43, and a rear exterior portion which tapers towards the matrix 10. The interior of the tail 95 has a substantially constant inside diameter which fits snugly on the exterior of the matrix 10. A forward surface of the tail 95 extends radially inward from the interior of the sleeve intermediate portion, thus forming a shoulder 85 that abuts the annular end 70 of the back inner sleeve 45, as shown in FIG. 2.

The tube nut 105 is placed over the outer sleeve 80 to secure a tubular connector 110 having a rounded interior end 115 adjacent the flared opening 60 of the composite tubing 5. Once the end 115 is positioned adjacent the opening 60, a passage 140 is created between the connector 110 and the tubing 5. The rear of the nut 105 includes a shoulder 120 for mating with the shoulder 85 of the outer sleeve 80. The other end of the nut 105 contains a plurality of internal threads 125 to mate with a plurality of external threads 130 of the connector 110.

As shown in FIG. 3, the tubular connector 110 is used to repair damaged tubing by connecting two pieces of composite tubing 5 and 5'. The connector 110 is symmetric about a vertical axis so that the opposing ends of the connector 110 contain ends 115 and 115' capable of sealing the channels 140 and 140' created by the connection of the flared openings 60 and 60' of the tubes 5 and 5' and the tubular connector 110.

The method of repairing a damaged composite tube 5 starts with cutting off the damaged portion of the tube 5. Then, the front 25 of the composite matrix 10 should be trimmed such that the front 20 of the metal liner 15 extends beyond the front of the matrix. The tube nut 105 is slid over the composite tubing 5 followed by the outer sleeve 80, and the back inner sleeve 45. The front inner sleeve 40 is then placed over the tubing 5 until the shoulder 50 abuts the front end 25 of the composite matrix 10. The back section 45 is positioned so that a small circumferential gap 65 exists between the sleeves 40 and 45. The gap 65 is preferably in the range of 0.010 to 0.020 inches. The front end 20 of the metal liner 15 is then flared to conform to the tapered end 55 of the front inner sleeve 40.

The pins 75 are then pressed into the holes 70 in the back inner sleeve 45 so that the inner ends penetrate the composite matrix 10, and the outer ends of the pins are flush with the exterior of the inner sleeve. This may be done with a suitable tweezers or other such tool, or a suitable clamping-type tool can be developed that would grip the outer sleeve to press all pins inwardly as a group. It is imperative that the insertion of the pins 75 not damage the metal liner 15. Once the pins 75 are in place, the outer sleeve 80 is slid over the inner sleeve 35 until the rear shoulder 85 of the outer sleeve 80 abuts the rear end 90 of the back inner sleeve 45. This limits the axial sliding of the outer sleeve 80. The outer sleeve 80 serves the function of keeping the pins 75 pressed into the composite matrix 10 and preventing the pins 75 from backing out of the holes 70 from forces induced by vibration or internal pressure.

Then the nut 105 is slid over the outer sleeve 80 until its interior shoulder 120 abuts the shoulder 100 of the outer sleeve 80. Finally, the end 115 of the tubular connector 110 is positioned flush against the flared opening 60 of the composite tubing 5 and the nut 105 is then screwed onto the metal connector 110 to create a sealed passage 140 between the fitting 30 and the composite tube 5 capable of withstanding high pressures.

While this invention has been described in connection with a high pressure hydraulic system, the connection disclosed is of course useful with tubes used for low pressure fluids or other purposes. For example, the tubing may be useful simply as a structural support member, and could then be a solid member rather than tubular. With low pressure fluids or with no fluid, a tube liner is of course not needed. The diameters of the tubing can likewise be much greater than that used for hydraulic systems. Similarly, while the invention arose because of the fitting problems associated with composite tubing, the system may be useful for other tubing. The number and the spacing of the retaining pins can of course be varied to fit the strength requirements.

We claim:

1. An end fitting for composite tubing, said tubing including a composite matrix of strong fibers and a binder, said fitting comprising:
   an inner sleeve for surrounding said matrix;
   a plurality of pins for inserting through said inner sleeve and penetrating said matrix to secure said inner sleeve to said tubing; and
   a rigid outer sleeve surrounding said inner sleeve to retain said pins in said inner sleeve, said outer sleeve including an annular tail having an inner diameter smaller than the outer diameter of said inner sleeve so that an annular shoulder engages the rear of said inner sleeve to retain the outer sleeve on the inner sleeve.

2. The fitting of claim 1, wherein said sleeve has a plurality of preformed holes for receiving said pins.

3. The fitting of claim 1, including a liner for positioning within said matrix, said liner being impervious to high pressure fluid, and wherein said pins are of such length that when inserted into said holes, said pins partly penetrate said composite tubing but do not extend to said liner.

4. The fitting of claim 1, wherein said pins are solid and have a tapered tip formed to facilitate penetrating said matrix binder.

5. The fitting of claim 1, wherein said pins are arranged in rows that extend at an angle from a longitudinal axis of said sleeve which is the same as some fibers of said matrix.

6. The fitting of claim 1, wherein said pins are arranged in a pattern which is random in its relationship to the orientation of said fibers in said matrix.

7. An end fitting for composite tubing, said tubing including a composite matrix of strong fibers and a binder, said fitting comprising:
   a front inner sleeve, without holes, for surrounding a forward end of said matrix;
   a back inner sleeve containing a plurality of holes for surrounding said matrix, spaced slightly axially from said front inner sleeve;
   a plurality of solid pins inserted into said holes for connecting said back inner sleeve to said composite matrix;
   a rigid outer sleeve surrounding said front and back inner sleeves to retain said pins in said holes; and
   securing means formed integral with said outer sleeve for retaining said outer sleeve over said tubing.

8. The fitting of claim 7, wherein said securing means includes a rear portion on said outer sleeve which closely surrounds said matrix and which forms a shoulder which engages a rear end of said inner sleeve to prevent said outer sleeve from moving forwardly off the end of said tubing.

9. The fitting of claim 8, wherein said securing means includes a forward portion on said outer sleeve surrounding said front inner sleeve, said outer sleeve forward portion having a rearwardly facing, annular shoulder to mate with a portion of a connector nut.

10. The fitting of claim 9, wherein said securing means includes an annular connector nut having a rear inwardly extending portion engaging said shoulder of said outer sleeve forward portion and said nut having a threaded forward portion for connection to another component.

11. The fitting of claim 7, wherein a front end of said front inner sleeve has a flared opening, to conform to a front end of a metal liner protruding beyond a front end of said matrix to enable said front end of said metal liner to provide a sealing surface for a mating component.

12. An end fitting for a composite member, said member including a composite matrix of strong fibers and a binder, said fitting comprising:
   one or more connectors to be positioned on an end of said matrix;
   a plurality of pointed elements to be positioned by said connectors and to penetrate said matrix for securing said connectors to said member;
   a rigid outer sleeve lined to said connectors to retain said elements in said matrix; and
   securing means fixed to said sleeve for retaining said sleeve over said composite member.

13. A combination comprising:
   a tube having a side wall;
   an inner sleeve surrounding the tube adjacent an end of the tube on which a fitting is desired, said sleeve having a side wall with a plurality of holes therethrough;
   a plurality of small pins positioned in said holes, said pins having tapered tips penetrating said tube but not extending completely through said tube wall, with the outer ends of the pins being flush with the exterior of said sleeve; and
   a rigid outer sleeve closely surrounding said inner sleeve to retain said pins in said tube, said outer sleeve having a rear cylindrical portion that closely surrounds said tube and forms an annular shoulder that engages the rear of said inner sleeve.

14. The combination of claim 13, wherein said outer sleeve includes a flange on its forward end for engagement with a connector nut.

15. A combination comprising:
   a rigid, elongated, composite member formed of a matrix of intersecting fibers bound together by a binder;
   a connector positioned adjacent an end of said composite member;
   a plurality of small pins lined to said connector and having tapered tips pressed into said member sufficiently far to cause said pins to be securely held by said matrix to thereby secure the connector to the composite member;
   a rigid outer sleeve surrounding said connector to retain said pins within said matrix; and
   said outer sleeve including a rear portion engaging said composite member and the rear of said connector to retain said outer sleeve over said composite member.

16. An end fitting for composite tubing, said tubing including a composite matrix of strong fibers and a binder, said fitting comprising:
   a sleeve for surrounding said matrix;
   a plurality of pins for inserting through said sleeve and penetrating said matrix to secure said sleeve to said tubing;
   an outer member surrounding said sleeve to retain said pins in said sleeve; and
   a nut positioned around said outer member for securing the tubing to another component.

17. An end fitting for composite tubing, said tubing including a composite matrix of strong fibers and a binder, said fitting comprising:
   a sleeve for surrounding said matrix;
   a plurality of pins for inserting through said sleeve and penetrating said matrix to secure said sleeve to said tubing; and
   an end ring which fits over the forward end of said matrix and has a front surface defining a flared opening into said tubing, and an inner shoulder to engage the end of said matrix, said end ring having a rear wall spaced slightly from said sleeve by an annular gap.

18. The fitting of claim 17, including a liner for positioning within said matrix, said liner being impervious to high pressure fluid, said liner having a forward end which protrudes beyond the end of said matrix and conforms to the shape of said flared opening to provide a forwardly facing sealing surface.

* * * * *

UNITED STATES PATENT AND TRADEMARK OFFICE
CERTIFICATE OF CORRECTION

PATENT NO. : 5,330,236
DATED : July 19, 1994
INVENTOR(S) : Robert F. Peterjohn, et al It is certified that error appears in the above-indentified patent and that said Letters Patent is hereby corrected as shown below:

Column 7, line 11, change "lined" to --linked--.

Column 7, line 40, change "lined" to --linked--.

Signed and Sealed this

First Day of November, 1994

Attest:

BRUCE LEHMAN

*Attesting Officer*           *Commissioner of Patents and Trademarks*